US00RE47605E

(19) United States
(12) Reissued Patent
Achilles

(10) Patent Number: US RE47,605 E
(45) Date of Reissued Patent: Sep. 17, 2019

(54) POLYCRYSTALLINE DIAMOND ELEMENTS, CUTTING ELEMENTS, AND RELATED METHODS

(71) Applicant: Baker Hughes Incorporated, Houston, TX (US)

(72) Inventor: Roy Derrick Achilles, Cape Town (ZA)

(73) Assignee: Baker Hughes, A GE Company, LLC, Houston, TX (US)

(21) Appl. No.: 14/272,347

(22) Filed: May 7, 2014

Related U.S. Patent Documents

Reissue of:
(64) Patent No.: 8,172,012
Issued: May 8, 2012
Appl. No.: 12/792,987
Filed: Jun. 3, 2010

U.S. Applications:
(63) Continuation of application No. 10/568,788, filed as application No. PCT/IB2005/001276 on May 11, 2005, now Pat. No. 7,730,977.

(30) Foreign Application Priority Data

May 12, 2004 (ZA) ..... 2004/3618

(51) Int. Cl.
*E21B 10/567* (2006.01)
*B23B 27/14* (2006.01)
*C23C 30/00* (2006.01)

(52) U.S. Cl.
CPC ..... *B23B 27/148* (2013.01); *C23C 30/005* (2013.01); *B23B 2226/315* (2013.01)

(58) Field of Classification Search
CPC ..... E21B 10/567; E21B 10/56; B24D 18/00
(Continued)

(56) References Cited

U.S. PATENT DOCUMENTS 3,745,623 A 7/1973 Wentorf et al.
4,224,380 A 9/1980 Bovenkerk et al.
(Continued)

FOREIGN PATENT DOCUMENTS

EP 0955445 A2 11/1999
EP 1190791 A2 3/2002
(Continued)

OTHER PUBLICATIONS

International Preliminary Report on Patentability for International Application No. PCT/IB2005/001276, dated Nov. 14, 2006.
(Continued)

*Primary Examiner* — Sara S Clarke
(74) *Attorney, Agent, or Firm* — TraskBritt

(57) ABSTRACT

A polycrystalline diamond abrasive cutting element consists generally of a layer of high grade polycrystalline diamond bonded to a cemented carbide substrate. The polycrystalline diamond layer has a working surface and an outer peripheral surface and is characterized by having an annular region or a portion thereof adjacent the peripheral surface that is lean in catalysing material. A region adjacent the working surface is also lean in catalysing material such that in use, as a wear scar develops, both the leading edge and the trailing edge thereof are located in a region lean in catalysing material.

36 Claims, 1 Drawing Sheet

(58) Field of Classification Search
USPC ..... 175/428, 432, 434; 51/309; 216/108; 428/408
See application file for complete search history.

(56) References Cited

U.S. PATENT DOCUMENTS

| | | | | |
|---|---|---|---|---|
| 4,268,276 | A | 5/1981 | Bovenkerk et al. | |
| 4,572,722 | A | 2/1986 | Dyer | |
| 4,593,777 | A | 6/1986 | Barr | |
| 4,636,253 | A | 1/1987 | Nakai et al. | |
| 4,664,705 | A | 5/1987 | Horton et al. | |
| 4,726,718 | A | 2/1988 | Meskin et al. | |
| 4,766,040 | A | 8/1988 | Hillert et al. | |
| 4,793,828 | A | 12/1988 | Burnand | |
| 4,871,377 | A | 10/1989 | Frushour | |
| 4,940,180 | A | 7/1990 | Martell | |
| 4,976,324 | A | 12/1990 | Tibbitts | |
| 5,011,514 | A | 4/1991 | Cho et al. | |
| 5,016,718 | A | 5/1991 | Tandberg | |
| 5,027,912 | A | 7/1991 | Juergens | |
| 5,127,923 | A | 7/1992 | Bunting et al. | |
| 5,135,061 | A * | 8/1992 | Newton, Jr. | 175/428 |
| 5,199,832 | A | 4/1993 | Meskin et al. | |
| 5,205,684 | A | 4/1993 | Meskin et al. | |
| 5,337,844 | A | 8/1994 | Tibbitts | |
| 5,437,343 | A | 8/1995 | Cooley et al. | |
| 5,460,233 | A | 10/1995 | Meany et al. | |
| 5,560,716 | A | 10/1996 | Tank et al. | |
| 5,645,617 | A | 7/1997 | Frushour | |
| 5,667,028 | A | 9/1997 | Truax et al. | |
| 5,722,499 | A | 3/1998 | Nguyen et al. | |
| 5,935,323 | A | 8/1999 | Tanga et al. | |
| 5,954,147 | A | 9/1999 | Overstreet et al. | |
| 5,979,578 | A | 11/1999 | Packer | |
| 6,009,963 | A | 1/2000 | Chaves et al. | |
| 6,063,333 | A | 5/2000 | Dennis | |
| 6,068,913 | A | 5/2000 | Cho et al. | |
| 6,189,634 | B1 | 2/2001 | Bertagnoli et al. | |
| 6,202,770 | B1 * | 3/2001 | Jurewicz et al. | 175/428 |
| 6,248,447 | B1 | 6/2001 | Griffin et al. | |
| 6,290,008 | B1 * | 9/2001 | Portwood et al. | 175/426 |
| 6,344,149 | B1 | 2/2002 | Oles | |
| 6,439,327 | B1 | 8/2002 | Griffin et al. | |
| 6,544,308 | B2 | 4/2003 | Griffin et al. | |
| 6,562,462 | B2 | 5/2003 | Griffin et al. | |
| 6,592,985 | B2 | 7/2003 | Griffin et al. | |
| 6,601,662 | B2 | 8/2003 | Matthias et al. | |
| 6,821,188 | B2 | 11/2004 | Tank et al. | |
| 7,517,589 | B2 | 4/2009 | Eyre | |
| 7,575,805 | B2 | 8/2009 | Achilles et al. | |
| 7,608,333 | B2 | 10/2009 | Eyre | |
| 7,647,993 | B2 | 1/2010 | Middlemiss | |
| 7,730,977 | B2 | 6/2010 | Achilles | |
| 2003/0206821 | A1 | 11/2003 | Tank et al. | |
| 2005/0139397 | A1 | 6/2005 | Achilles et al. | |
| 2005/0263328 | A1 | 12/2005 | Middlemiss | |
| 2006/0060390 | A1 | 3/2006 | Eyre | |
| 2006/0060391 | A1 | 3/2006 | Eyre et al. | |
| 2006/0060392 | A1 | 3/2006 | Eyre | |
| 2006/0086540 | A1 | 4/2006 | Griffin et al. | |
| 2006/0260850 | A1 | 11/2006 | Roberts et al. | |
| 2007/0039762 | A1 | 2/2007 | Achilles | |
| 2007/0181348 | A1 | 8/2007 | Lancaster et al. | |

FOREIGN PATENT DOCUMENTS

| | | | |
|---|---|---|---|
| GB | 2374618 | A | 10/2002 |
| JP | 59219500 | A | 12/1984 |
| JP | 2004-509054 | | 3/2004 |
| JP | 2004509054 | A | 3/2004 |
| RU | 2034937 | C1 | 5/1995 |
| RU | 566439 | C | 1/2000 |
| RU | 566439 | C | 9/2004 |
| RU | 2034937 | C1 | 9/2004 |
| WO | 093023204 | A1 | 11/1993 |
| WO | 0224601 | A1 | 3/2002 |
| WO | 03064806 | A1 | 8/2003 |
| WO | 04106003 | A1 | 12/2004 |
| WO | 04106004 | A1 | 12/2004 |
| WO | 2005110648 | A2 | 11/2005 |

OTHER PUBLICATIONS

International Search Report for International Application No. PCT/IB2005/001276 dated Nov. 14, 2005, 5 pages.
International Written Opinion for International Application No. PCT/IB2005/001276, dated Nov. 14, 2005, 5 pages.
Declaration of Stephen C. Steinke, dated Jul. 21, 2008, 4 pages.
Field Trial Report for Smith Test Bits with Partially Leached Cutters Occurring on or before Dec. 22, 2003. (Confidential—can be obtained through U.S. Appl. No. 11/022,271.
Office Action from the Israel Patent Office, dated Nov. 11, 2009, for co-pending Israel Patent Application No. 179201, 2 pages.
Office Action from the Japanese Patent Office, dated Dec. 14, 2010, for copending Japanese Patent Application No. 2007-512577.

* cited by examiner

POLYCRYSTALLINE DIAMOND ELEMENTS, CUTTING ELEMENTS, AND RELATED METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 10/568,788, filed Oct. 3, 2006, now U.S. Pat. No. 7,730,977 issued Jun. 8, 2010, which is a U.S. National Phase Entry of International patent application Ser. No. PCT/IB2005/001276, filed May 11, 2005, which claims priority to South African Patent Application No. 2004/3618, filed May 12, 2004, the disclosure of each of which is hereby incorporated herein by this reference in its entirety.

BACKGROUND OF THE INVENTION

This invention relates to tool inserts and more particularly to cutting tool inserts for use in drilling and coring holes in subterranean formations.

A commonly used cutting tool insert for drill bits is one which comprises a layer of polycrystalline diamond (PCD) bonded to a cemented carbide substrate. The layer of PCD presents a working face and a cutting edge around a portion of the periphery of the working surface.

Polycrystalline diamond, also known as a diamond abrasive compact, comprises a mass of diamond particles containing a substantial amount of direct diamond-to-diamond bonding. Polycrystalline diamond will generally have a second phase which contains a diamond catalyst/solvent such as cobalt, nickel, iron or an alloy containing one or more such metals.

In drilling operations, such a cutting tool insert is subjected to heavy loads and high temperatures at various stages of its life. In the early stages of drilling, when the sharp cutting edge of the insert contacts the subterranean formation, the cutting tool is subjected to large contact pressures. This results in the possibility of a number of fracture processes such as fatigue cracking being initiated.

As the cutting edge of the insert wears, the contact pressure decreases and is generally too low to cause high energy failures. However, this pressure can still propagate cracks initiated under high contact pressures; and can eventually result in spalling-type failures.

In the drilling industry, PCD cutter performance is determined by a cutter's ability to both achieve high penetration rates in increasingly demanding environments, and still retain a good condition post-drilling (hence enabling re-use). In any drilling application, cutters may wear through a combination of smooth, abrasive type wear and spalling/chipping type wear. Whilst a smooth, abrasive wear mode is desirable because it delivers maximum benefit from the highly wear-resistant PCD material, spalling or chipping type wear is unfavourable. Even fairly minimal fracture damage of this type can have a deleterious effect on both cutting life and performance.

With spalling-type wear, cutting efficiency can be rapidly reduced as the rate of penetration of the drill bit into the formation is slowed. Once chipping begins, the amount of damage to the table continually increases, as a result of increased normal force now required to achieve a given depth of cut. Therefore, as cutter damage occurs and the rate of penetration of the drill bit decreases, the response of increasing weight on bit can quickly lead to further degradation and ultimately catastrophic failure of the chipped cutting element.

In optimizing PCD cutter performance, increasing wear resistance (in order to achieve better cutter life) is typically achieved by manipulating variables such as average diamond grain size, overall catalyst/solvent content, diamond density and the like. Typically, however, as PCD material is made more wear resistant it becomes more brittle or prone to fracture. PCD elements designed for improved wear performance will therefore tend to have poor impact strength or reduced resistance to spalling. This trade-off between the properties of impact resistance and wear resistance makes designing optimized PCD structures, particularly for demanding applications, inherently self-limiting.

If the chipping behaviours of more wear resistant PCD can be eliminated or controlled, then the potentially improved performance of these types of PCD cutters can be more fully realised.

Previously, modification of the cutting edge geometry by bevelling was perceived to be a promising approach to reducing this chipping behaviour. It has been shown (U.S. Pat. Nos. 5,437,343 and 5,016,718) that pre-bevelling or rounding the cutting edge of the PCD table significantly reduces the spalling tendency of the diamond cutting table. This rounding, by increasing the contact area, reduces the effect of the initial high stresses generated during loading when the insert contacts the earthen formation. However, this chamfered edge wears away during use of the PCD cutter and eventually a point is reached where no bevel remains. At this point, the resistance of the cutting edge to spalling-type wear will be reduced to that of the unprotected/unbevelled PCD material.

U.S. Pat. No. 5,135,061 suggests that spalling-type behaviour can also be controlled by manufacturing the cutter with the cutting face formed of a layer of PCD material which is less wear resistant than the underlying PCD material(s), hence reducing its tendency to spall. The greater wear of the less wear resistant layer in the region of the cutting edge provides a rounded edge to the cutting element where it engages the formation. The rounding of the cutting edge achieved by this invention hence has a similar anti-spalling effect to bevelling. The advantages of this approach can be significantly outweighed by the technical difficulty of achieving a satisfactorily thin, less wear resistant layer in situ during the synthesis process. (The consistent and controlled behaviour of this anti-spalling layer is obviously highly dependent on the resultant geometry). In addition, the reduced wear resistance of this upper layer can begin to compromise the overall wear resistance of the cutter—resulting in a more rapid bluntening of the cutting edge and sub-optimal performance.

JP 59-219500 claims an improvement in the performance of PCD sintered materials after a chemical treatment of the working surface. This treatment dissolves and removes the catalyst/solvent matrix in an area immediately adjacent to the working surface. The invention is claimed to increase the thermal resistance of the PCD material in the region where the matrix has been removed without compromising the strength of the sintered diamond.

A PCD cutting element has recently been introduced on the market which is said to have improved wear resistance without loss of impact strength. U.S. Pat. Nos. 6,544,308 and 6,562,462 describe the manufacture and behaviour of such cutters. The PCD cutting element is characterised inter alia by a region adjacent the cutting surface which is substantially free of catalysing material. The improvement of performance of these cutters is ascribed to an increase in the wear resistance of the PCD in this area; where the removal of the catalyst material results in decreased thermal degradation of the PCD in the application.

Whilst removing the catalyst/solvent in this region substantially reduces the incidence of the highly detrimental spalling failure on the leading edge, spalling-type failure on the trailing edge, which originates from characteristic lamellar-type cracking in this region, can also have a significant effect on performance. Although the stresses in the region of the trailing edge are not as high as those on the leading edge, cracking in this area can cause substantial material loss and hence degrade the performance of the cutter.

SUMMARY OF THE INVENTION

According to the present invention, there is provided a polycrystalline diamond abrasive element, particularly a cutting element, comprising a layer of polycrystalline diamond, preferably of a high grade, bonded to a substrate, particularly a cemented carbide substrate, along an interface, the polycrystalline diamond layer having a working surface opposite the interface and an outer peripheral surface extending between the working surface and the interface, the polycrystalline diamond abrasive element being characterised by having an annular region adjacent the peripheral surface extending away from the working surface, the annular region or a portion thereof being lean in catalysing material.

The polycrystalline diamond layer preferably includes a region, typically a layer, adjacent the working surface that is also lean in catalysing material.

As a consequence, the preferred polycrystalline diamond layer comprises an annular region, which defines a complete or interrupted annulus, extending away from the working surface and a region adjacent the working surface that are lean in catalysing material such that in use, as a wear scar develops, both the leading edge and the trailing edge thereof are located in a region lean in catalysing material.

The polycrystalline diamond abrasive element is preferably as described in published international patent applications WO 2004/106003 and WO 2004/106004, both of which are incorporated herein by reference.

The polycrystalline diamond layer has a region adjacent the peripheral surface which is lean in catalysing material. This region extends laterally into the polycrystalline diamond from the peripheral surface generally to a depth of about 30 μm to about 500 μm. This region also extends from the peripheral edge of the working surface towards the interface to a depth of at least half the overall thickness of the polycrystalline diamond layer, but stops short of the interface by at least about 500 μm.

The polycrystalline diamond layer also preferably has a region adjacent the working surface which is lean in catalysing material. Generally, this region will be substantially free of catalysing material. The region will extend into the polycrystalline diamond from the working surface generally to a depth of as low as about 30 μm to no more than about 500 μm.

The polycrystalline diamond also has a region rich in catalysing material. The catalysing material is present as a sintering agent in the manufacture of the polycrystalline diamond layer. Any diamond catalysing material known in the art may be used. Preferred catalysing materials are Group VIII transition metals such as cobalt and nickel. The region rich in catalysing material will generally have an interface with the region lean in catalysing material and extend to the interface with the substrate.

The region rich in catalysing material may itself comprise more than one region. The regions may differ in average particle size, as well as in chemical composition. These regions, when provided, will generally lie in planes parallel to the working surface of the polycrystalline diamond layer.

In the preferred structure of the invention, the regions lean in catalysing material define a cap-like structure overlying the region rich in catalysing material or a portion thereof.

According to another aspect of the invention, a method of producing a PCD abrasive element as described above includes the steps of creating an unbonded assembly by providing a substrate, which may include a non-planar interfacial surface, placing a mass of diamond particles on the substrate, the mass of diamond particles preferably being selected so as to be capable of producing high grade polycrystalline diamond, and providing a source of catalysing material for the diamond particles, subjecting the unbonded assembly to conditions of elevated temperature and pressure suitable for producing a polycrystalline diamond layer of the mass of diamond particles, such layer being bonded to the substrate, and removing catalysing material from respective regions of the polycrystalline diamond layer adjacent the exposed working and peripheral surfaces thereof, respectively.

The catalysing material is preferably removed to a depth of at least half the overall thickness of the polycrystalline diamond layer.

The substrate will generally be a cemented carbide substrate. The source of catalysing material will generally be the cemented carbide substrate. Some additional catalysing material may be mixed in with the diamond particles.

Catalysing material is removed from the regions of the polycrystalline diamond layer adjacent the exposed surfaces thereof. Generally, these surfaces are on a side of the polycrystalline layer opposite to the substrate, which provides a working surface for the polycrystalline diamond layer, and a peripheral surface extending between the working surface and the substrate. Removal of the catalysing material may be carried out using methods known in the art such as electrolytic etching, acid leaching and evaporation techniques.

The catalysing material is typically removed by acid leaching. In order to achieve a so-called interrupted annulus lean in catalysing material, use can be made of an agent that is impervious to acid attack to enable masked leaching.

The conditions of elevated temperature and pressure necessary to produce the polycrystalline diamond layer from a mass of diamond particles are well known in the art. Typically, these conditions are pressures in the range 4 GPa to 8 GPa and temperatures in the range 1300° C. to 1700° C.

Further according to the invention, there is provided a rotary drill bit containing a plurality of cutter elements, substantially all of which are PCD abrasive elements, as described above.

The invention extends to a method of reducing, preferably eliminating, spalling and/or chipping type wear in a polycrystalline diamond abrasive element susceptible to such wear, including the step of removing catalysing material from regions of the polycrystalline diamond layer adjacent both exposed surfaces thereof.

It has been found that the PCD abrasive elements of the invention have significantly improved wear behaviour, as a result of controlling the spalling and chipping wear component, than PCD abrasive elements of the prior art.

BRIEF DESCRIPTION OF THE DRAWINGS

The invention will now be described in more detail, by way of example only, with reference to the accompanying drawings in which.

DETAILED DESCRIPTION OF THE INVENTION

The polycrystalline diamond abrasive element of the invention has particular application as a cutter element for drill bits. In this application, it has been found to have excellent wear resistance and impact strength without being susceptible to spalling or chipping in either the leading edge or trailing edge of the typical wear scar. These properties allow it to be used effectively in drilling or boring of subterranean formations having high compressive strength.

Figure 1:
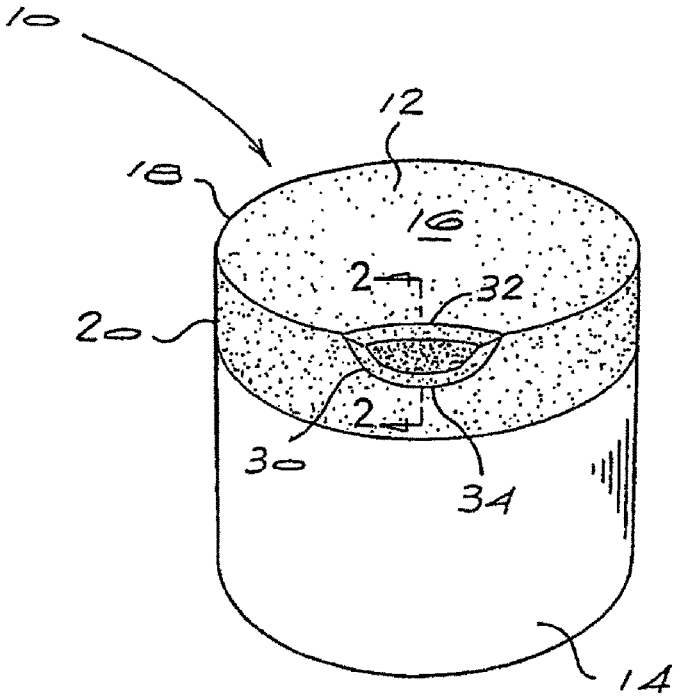
FIG. 1 is a perspective view of a preferred embodiment of a polycrystalline diamond abrasive element of the invention.
Figure 2:
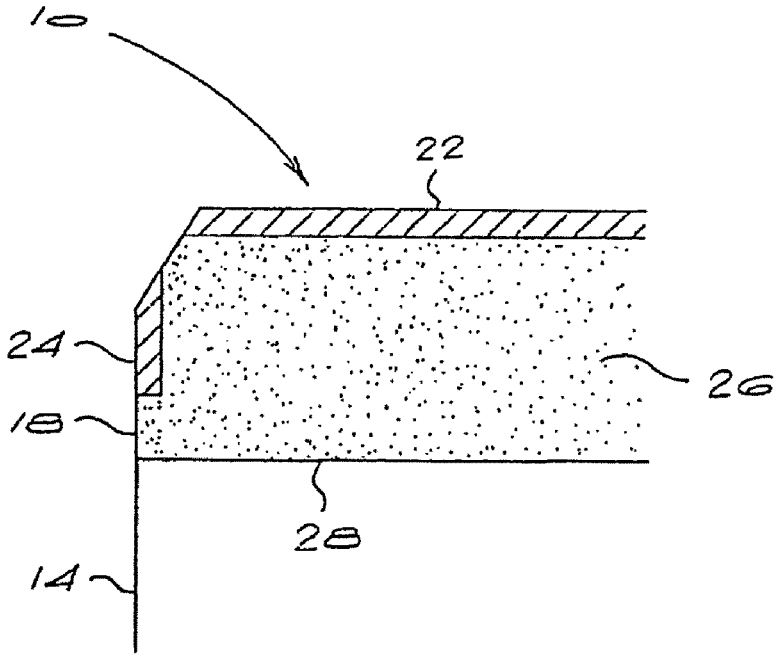
FIG. 2 is a cross-sectional side view along the line 2-2 of the polycrystalline diamond abrasive element of FIG. 1.

Referring to FIGS. 1 and 2 of the accompanying drawings, the cutting element 10 has a polycrystalline diamond layer 12, bonded to a substrate 14. The polycrystalline diamond layer 12 has an upper working surface 16 around which is a peripheral cutting edge 18 and a peripheral surface 20. The polycrystalline diamond layer 12 has respective regions 22, 24 lean in catalysing material and a region 26 rich in catalysing material. The regions 22, 24 lean in catalysing material extend respectively from the working surface 16 and peripheral surface 20 into the polycrystalline diamond layer 12. The depth of each region, as it extends laterally away from the respective surface 16, 20, will typically be no more than 500 microns, and is preferably 30 to 400 microns, most preferably 60 to 350 microns. In addition, the region 24 extends to a depth, from the working surface 16 towards the substrate 14, of at least half the overall thickness of the polycrystalline diamond layer 12, but preferably stops short of the interface region 28 by at least 500 μm in order to prevent inadvertent leaching of the interface region 28.

Typically, if the PCD edge is bevelled, the regions 22, 24 lean in catalysing material will generally follow the shape of this bevel and extend along the length of the bevel. The balance of the polycrystalline diamond layer 12 extending to the cemented carbide substrate 14 is the region 26 rich in catalysing material. In addition, the surfaces 16, 20 of the PCD element may be mechanically polished so as to achieve a low-friction surface or finish.

In use, as the PCD layer 12 contacts a substrate to be drilled, it develops a wear scar 30 having a leading edge 32 and a trailing edge 34. By providing respective regions 22, 24 lean in catalysing material, as the wear scar 30 develops both the leading edge 32 and the trailing edge 34 are located in a region lean in catalysing material. Thus, the previously perceived advantages of removing catalyst material from the working surface of a PCD abrasive element are now extended to the trailing edge 34, further improving the performance thereof in use. In the present embodiment, the region 24 is in the form of a complete annular region lean in catalysing material. In practise, typically only a few segments of the diamond layer 12 are used in the drilling operation. For instance, the insert may be rotated through 90° when the wear scar 30 develops too large, thereby forming a new wear scar. By repeating this operation, four wear scars could develop, for example. It is therefore possible to leach only those portions of region 24 corresponding to the segments where the respective wear scars will form, thereby forming a so-called interrupted annular region lean in catalysing material.

Generally, the layer of polycrystalline diamond 12 will be produced and bonded to the cemented carbide substrate 14 by methods known in the art.

Thereafter, catalysing material is removed from the working surface 16 and peripheral surface 20 of the particular embodiment using any one of a number of known methods. One such method is the use of a hot mineral acid leach, for example a hot hydrochloric acid leach. Typically, the temperature of the acid will be about 110° C. and the leaching times will be 3 to 60 hours. The area of the polycrystalline diamond layer which is intended not to be leached and the carbide substrate will be suitably masked with acid-resistant material. This will also apply where an interrupted region 24 is provided.

In producing the polycrystalline diamond abrasive elements described above, a layer of diamond particles, optionally mixed with some catalysing material, will be placed on a cemented carbide substrate. This unbonded assembly is then subjected to elevated temperature and pressure conditions to produce polycrystalline diamond of the diamond particles bonded to the cemented carbide substrate. The conditions and steps required to achieve this are well known in the art.

The diamond particles will preferably comprise a mix of diamond particles, differing in average particle sizes. In one embodiment, the mix comprises particles having five different average particle sizes as follows:

| Average Particle Size (in microns) | Percent by mass |
|---|---|
| 20 to 25 (preferably 22) | 25 to 30 (preferably 28) |
| 10 to 15 (preferably 12) | 40 to 50 (preferably 44) |
| 5 to 8 (preferably 6) | 5 to 10 (preferably 7) |
| 3 to 5 (preferably 4) | 15 to 20 (preferably 16) |
| less than 4 (preferably 2) | less than 8 (preferably 5) |

In another embodiment, the polycrystalline diamond layer comprises two layers differing in their mix of particles. The first layer, adjacent the working surface, has a mix of particles of the type described above. The second layer, located between the first layer and the substrate, is one in which (i) the majority of the particles have an average particle size in the range of 10 microns to 100 microns, and consists of at least three different average particle sizes and (ii) at least 4 percent by mass of particles have an average particle size of less than 10 microns. Both the diamond mixes for the first and second layers may also contain admixed catalyst material.

What is claimed is:

1. A polycrystalline diamond element, comprising:

a substrate;

a polycrystalline diamond layer bonded to the substrate along an interface, the polycrystalline diamond layer comprising:

a working surface opposite the interface;

a region adjacent the working surface lean in catalyzing material and extending away from the working surface to a depth;

a peripheral surface located between the working surface and the interface;

a substantially annular region lean in catalyzing material adjacent and extending along the peripheral surface away from the working surface a distance toward the interface greater than the depth of the region lean in catalyzing material adjacent the working surface and radially inward of the substantially annular region the substantially annular region having a radially inner periphery extending below the depth of the region adjacent the working surface lean in catalyzing material and radially inward of the substantially annular region; and a region rich in catalyzing material having a portion located radially inward of and adjacent the radially inner periphery of the substantially annular region lean in catalyzing material and at least another portion extending to the peripheral surface and located between the substantially annular region and the interface.

2. The polycrystalline diamond element of claim 1, wherein the region of the polycrystalline diamond layer adjacent the working surface lean in catalyzing material and radially inward of the substantially annular region lean in catalyzing material extends into the polycrystalline diamond layer from the working surface to a depth of about 30 μm to about 500 μm.

3. The polycrystalline diamond element of claim 1, wherein the region of the polycrystalline diamond layer adjacent the working surface lean in catalyzing material is adjacent substantially all of the working surface.

4. The polycrystalline diamond element of claim 3, wherein the region of the polycrystalline diamond layer adjacent the working surface and the region of polycrystalline diamond layer adjacent and extending along the peripheral surface lean in catalyzing material together define a cap-like structure overlying and peripherally surrounding the portion of the region of the polycrystalline diamond layer rich in catalyzing material.

5. The polycrystalline diamond element of claim 1, wherein the region of the polycrystalline diamond layer adjacent the working surface lean in catalyzing material and the region of the polycrystalline diamond layer adjacent and extending along the peripheral surface lean in catalyzing material are contiguous.

6. The polycrystalline diamond element of claim 5, further including a bevel between the working surface and the peripheral surface having an adjacent region lean in catalyzing material.

7. The polycrystalline diamond element of claim 1, wherein a portion of the substantially annular region lean in catalyzing material located below the depth of the region adjacent the working surface lean in catalyzing material and radially inward of the substantially annular region extends into the polycrystalline diamond layer from the peripheral surface to a depth of about 30 μm to about 500 μm.

8. The polycrystalline diamond element of claim 1, wherein the substantially annular region lean in catalyzing material extends from the working surface along the peripheral surface toward the interface to a depth of at least half of an overall thickness of the polycrystalline diamond layer.

9. The polycrystalline diamond element of claim 8, wherein the substantially annular region lean in catalyzing material stops short of the interface by at least about 500 μm.

10. The polycrystalline diamond element of claim 1, wherein the substantially annular region lean in catalyzing material comprises an annular region.

11. The polycrystalline diamond element of claim 1, wherein the region rich in catalyzing material comprises a plurality of regions which differ in at least one of average particle size and chemical composition.

12. The polycrystalline diamond element of claim 1, wherein the polycrystalline diamond element is configured as a cutting element.

13. The polycrystalline diamond element of claim 12, wherein the cutting element is mounted on a drill bit for drilling subterranean formations.

14. The polycrystalline diamond element of claim 1, wherein the substrate comprises a cemented carbide.

15. A cutting element for use in drilling subterranean formations, comprising:

a polycrystalline diamond layer bonded to a substrate, the polycrystalline diamond layer comprising:

a working surface;

a region lean in catalyzing material adjacent the working surface;

a peripheral surface extending between the working surface and the substrate;

an annular region lean in catalyzing material adjacent the peripheral surface and extending from adjacent the working surface toward the substrate a distance greater than a depth of the region lean in catalyzing material adjacent the working surface located laterally inward of the annular region; and at least one other region in the polycrystalline diamond layer rich in catalyzing material, the at least one other region rich in catalyzing material comprising a portion laterally inward of an inner lateral periphery of the annular region and at least another portion extending to the peripheral surface between the annular region and the substrate.

16. The cutting element of claim 15, wherein the region of the polycrystalline diamond layer adjacent the working surface lean in catalyzing material lies adjacent substantially all of the working surface.

17. The cutting element of claim 16, wherein the region of the polycrystalline diamond layer adjacent the working surface and the region of the polycrystalline diamond layer adjacent the peripheral surface lean in catalyzing material together form a cap-like structure overlying and peripherally surrounding the portion of the at least one other region of the polycrystalline diamond layer rich in catalyzing material.

18. The cutting element of claim 15, wherein the region of the polycrystalline diamond layer adjacent the working surface lean in catalyzing material and the region of the polycrystalline diamond layer adjacent the peripheral surface lean in catalyzing material are contiguous.

19. The cutting element of claim 18, further including a bevel between the working surface and the peripheral surface having an adjacent region lean in catalyzing material.

20. The cutting element of claim 15, wherein at least one of a portion of the region of the polycrystalline diamond layer adjacent the working surface laterally inward of the annular region and a portion of the annular region lean in catalyzing material adjacent the peripheral surface extending a distance from the working surface greater than the depth of the region lean in catalyzing material adjacent the working surface located laterally inward of the annular region extends into the polycrystalline diamond layer from the respectively adjacent surface to a depth of about 30 μm to about 500 μm.

21. The cutting element of claim 15, wherein the annular region lean in catalyzing material extends from adjacent the working surface along the peripheral surface toward the substrate a distance of at least half of an overall thickness of the polycrystalline diamond layer.

22. The cutting element of claim 21, wherein the annular region lean in catalyzing material is spaced from an interface with the substrate at a periphery of the cutting element by at least about 500 μm.

23. The cutting element of claim 15, wherein the cutting element is mounted on a drill bit for drilling subterranean formations.

24. The cutting element of claim 15, wherein the substrate comprises a cemented carbide.

*25. A method of forming a polycrystalline diamond element, the method comprising:*

*forming a diamond abrasive compact at a pressure between 7 GPa and 8 GPa; and*

*removing a portion of catalyzing material from the diamond abrasive compact to form:*

*a first region of the diamond abrasive compact lean in catalyzing material adjacent a working surface of the diamond abrasive compact and extending away from the working surface to a depth;*

*a substantially annular region of the diamond abrasive compact lean in catalyzing material and extending along a peripheral surface of the diamond abrasive compact away from the working surface a distance greater than a depth of the first region lean in catalyzing material adjacent the working surface, the substantially annular region having a radially inner periphery extending below the depth of the first region adjacent the working surface lean in catalyzing material; and*

*a second region of the diamond abrasive compact rich in catalyzing material having a portion located radially inward of and adjacent the radially inner periphery of the substantially annular region lean in catalyzing material and at least another portion extending to the peripheral surface of the diamond abrasive compact.*

*26. The method of claim 25, further comprising attaching the diamond abrasive compact to a substrate.*

*27. The method of claim 26, further comprising spacing the substantially annular region of the diamond abrasive compact lean in catalyzing material between 30 microns and 500 microns from an interface between the diamond abrasive compact and the substrate.*

*28. The method of claim 25, further comprising extending a portion of the first region of the diamond abrasive compact radially inward of the substantially annular region into the diamond abrasive compact from the working surface to a depth between 30 microns and 500 microns.*

*29. The method of claim 25, further comprising extending a portion of the first region of the diamond abrasive compact radially inward of the substantially annular region into the diamond abrasive compact from the working surface to a depth between 300 microns and 500 microns.*

*30. The method of claim 25, further comprising extending the first region of the diamond abrasive compact into the diamond abrasive compact from the working surface to a depth between 300 microns and 500 microns.*

*31. A method of forming a cutting element for use in subterranean formations, the method comprising:*

*forming a diamond abrasive compact at a pressure between 7 GPa and 8 GPa; and*

*removing a portion of catalyzing material from the diamond abrasive compact to form:*

*a first region of the diamond abrasive compact lean in catalyzing material adjacent a working surface of the diamond abrasive compact and comprising a portion extending away from the working surface to a depth between 300 microns and 500 microns;*

*a substantially annular region of the diamond abrasive compact lean in catalyzing material and extending along a peripheral surface of the diamond abrasive compact away from the working surface a distance greater than a depth of the portion of the first region lean in catalyzing material adjacent the working surface; and*

*a second region of the diamond abrasive compact rich in catalyzing material having a portion located radially inward of the substantially annular region and at least another portion extending to the peripheral surface of the diamond abrasive compact.*

*32. A cutting element for use in subterranean formations, comprising:*

*a diamond abrasive compact formed at a pressure between 7 GPa and 8 GPa, the diamond abrasive compact comprising:*

*a first region lean in catalyzing material adjacent a working surface of the diamond abrasive compact and extending away from the working surface to a depth;*

*a substantially annular region lean in catalyzing material and extending along a peripheral surface of the diamond abrasive compact away from the working surface a distance greater than a depth of the first region lean in catalyzing material adjacent the working surface; and*

*a second region rich in catalyzing material having a portion located radially inward of the substantially annular region and at least another portion extending to the peripheral surface of the diamond abrasive compact.*

*33. The cutting element of claim 32, wherein a portion of the first region radially inward of the substantially annular region extends away from the working surface to a depth between 300 microns and 500 microns.*

*34. The cutting element of claim 32, wherein the first region extends away from the working surface to a depth between 300 microns and 500 microns.*

*35. The cutting element of claim 32, further comprising a substrate bonded to the diamond abrasive compact at an interface.*

*36. The cutting element of claim 35, wherein the substantially annular region lean in catalyzing material is spaced from the interface between the diamond abrasive compact and the substrate by a depth of between 300 microns and 500 microns.*

* * * * *